US009018831B2

(12) United States Patent
Li et al.

(10) Patent No.: US 9,018,831 B2
(45) Date of Patent: Apr. 28, 2015

(54) TRIODE-TYPE FIELD EMISSION DEVICE AND METHOD OF MANUFACTURING THE SAME

(75) Inventors: Yuan-Yao Li, Taiwan (TW); Meng-Jey Youh, Taiwan (TW); Chun-Lung Tseng, Taiwan (TW); Hung-Chih Wu, Taiwan (TW); Yen-Ming Juan, Taiwan (TW); Wang-Hua Lin, Taiwan (TW)

(73) Assignee: National chung Cheng University, Chia-Yi (TW)

( * ) Notice: Subject to any disclaimer, the term of this patent is extended or adjusted under 35 U.S.C. 154(b) by 565 days.

(21) Appl. No.: 13/419,821

(22) Filed: Mar. 14, 2012

(65) Prior Publication Data
US 2013/0015778 A1  Jan. 17, 2013

(30) Foreign Application Priority Data
Jul. 15, 2011  (TW) .............................. 100125106 A

(51) Int. Cl.
*H05B 41/16* (2006.01)
*H01J 63/04* (2006.01)
*H01J 9/18* (2006.01)
*B82Y 10/00* (2011.01)

(52) U.S. Cl.
CPC . *H01J 9/18* (2013.01); *H01J 63/04* (2013.01); *B82Y 10/00* (2013.01)

(58) Field of Classification Search
USPC ............. 313/495–497, 306, 309–310; 445/50
See application file for complete search history.

(56) References Cited

U.S. PATENT DOCUMENTS

| 7,399,215 B2* | 7/2008 | Tsukamoto ...................... 445/51 |
| 2002/0104603 A1* | 8/2002 | Chang et al. ............... 156/89.12 |
| 2009/0058309 A1* | 3/2009 | Jeong et al. ................. 315/169.3 |
| 2010/0285715 A1* | 11/2010 | Li et al. ............................ 445/50 |
| 2013/0241434 A1* | 9/2013 | Guo et al. ...................... 315/260 |

* cited by examiner

*Primary Examiner* — Tracie Y Green
(74) *Attorney, Agent, or Firm* — Muncy, Geissler, Olds & Lowe, P.C.

(57) ABSTRACT

A triode-type field emission device and method of manufacturing the same, suitable for use in screen print process of curved or planar substrate, comprising the following steps: firstly, form a cathode and a gate on a cathode substrate at the same time by means of screen printing, and a gap is located between gate and cathode, to avoid short circuit or interference; next, form a hedgehog-shape field emission layer on at least said cathode; then, form a transparent conductive layer and a light emitting layer sequentially on an anode substrate; and finally, dispose cathode substrate and anode substrate in parallel and spaced apart, and package them into a triode-type field emission device. Bias of cathode and gate can be controlled to achieve local adjustment of light. Also, gate may serve as an emitter, to increase field emission efficiency and its service life.

18 Claims, 8 Drawing Sheets

TRIODE-TYPE FIELD EMISSION DEVICE AND METHOD OF MANUFACTURING THE SAME

BACKGROUND OF THE INVENTION

1. Field of the Invention

The present invention relates to a triode-type field emission device and method of manufacturing the same, and in particular to triode type field emission device having planar light source made by means of a screen printing process.

2. The Prior Arts

Following Cathode Ray Tube (CRT) Display and Liquid Crystal Display (LCD), Field Emission Display (FED) emerges as the most promising display technology of the next generation having great potential for future development. Compared with the displayer of the prior art, the Field Emission Display (FED) has the benefit of good displaying effect, wide vision angle, low power consumption, and compact size. In particular, in recent years, the field emission display of carbon nanotube, namely carbon nanotube field emission display (CNT-FED) is getting more and more attention.

In general, the structure of field emission display can be classified into a two-electrode structure and a three-electrode structure. The two-electrode structure is a field emission structure having an anode and a cathode, and its drawback is that, in application, it requires applying high voltage, thus its electron emission and uniformity are difficult to control. The three-electrode structure is an improvement of the two-electrode structure, a gate is added to control precisely the emission of electrons, thus having the advantages of requiring low voltage and small current to operate, and achieving self-emitting high illumination features of CRT. Therefore, in recent years, the three-electrode structure is very popular and has a good competitive edge in the market.

Wherein, the basic structure of the three-electrode structure is composed of a fluorescent layer of anode, an emission layer of cathode, and a gate. As shown in FIG. 1, the field emission device includes a cathode substrate 10 and an anode substrate 12 disposed parallel to each other, and a spacer column 14 is disposed in between as support to provide a vacuum space. The anode substrate 12 includes an anode layer 16 and a fluorescent layer 18; and the cathode substrate 10 includes a cathode layer 20, a gate layer 22, and a dielectric layer 24 in between. On the cathode layer 20 is produced a carbon nanotube to serve as an emission layer 26, the a hole 28 corresponding to the emission layer 26 is produced on the dielectric layer 24 and the gate layer 22 by means of lithographic process, hereby forming a point light source. In application, different voltages are applied on the anode layer 16, the cathode layer 20, and the gate layer 22. The gate layer 22 allows the electrons of the cathode layer 20 to be emitted from the emission layer 26, that passes through the hole 28 and impact on the fluorescent layer 18 of the anode substrate 12 through the acceleration of an electric field, in agitating the fluorescent layer 18 to emit lights.

Though the structure mentioned above is able to control effectively the direction of electron beams, yet the emission surface of the emission layer 26 is far lower than the gate layer 22, so that not only the threshold voltage of field emission is increased, the emission current density is decreased, but the electrons emitted are also liable to have greater angle of deflection due to the electric field of the gate layers 22 on two sides, thus making electrons impact on areas outside the fluorescent layer 18, in creating the problem of non-uniform light emission for images having central part dimmer and edge portion brighter. In addition, in case screen printing is used to produce carbon nanotube emission layer on the cathode layer 20, the electron emission thus produced is without a fixed direction, therefore, requiring further activation. The approach frequently utilized to solve the problem is to use a gum tape to pull up the flat carbon nanotube to be perpendicular to the cathode layer 20, however, this approach will make chemical material in the gum tape remain in the cathode layer 20 to create secondary pollution; besides, direct contact could destroy the structure and affect the stability and service life of the emission layer.

Therefore, presently, the design and performance of the field emission device is not quite satisfactory, and it has much room for improvements.

SUMMARY OF THE INVENTION

In view of the problems and shortcomings of the prior art, the present invention provides a triode-type field emission device and a method of manufacturing the same, so as to solve the problem of the prior art.

A major objective of the present invention is to provide a triode-type field emission device and a method of manufacturing the same. Wherein, screen printing is used to raise the simplicity, yield, and applicability of the production, so as to produce the light emitting products, such as backlight module and illumination light tube of large area displayer, thus resolving various restrictions and cost considerations in manufacturing large area flat or curved surface substrates of the prior art, and reducing or simplifying the complicated processes of lithography.

A secondary objective of the present invention is to provide a triode-type field emission device and a method of manufacturing the same. Wherein, screen printing is used to produce gate and cathode having gap in between on a co-plane in achieving electron emission capability, and obtaining a flat and even planar light source.

Another objective of the present invention is to provide a triode-type field emission device and a method of manufacturing the same. Wherein, hedgehog-shape field emission layer is produced to emit electrons in an anode direction, so as to eliminate the subsequent steps of surface activation, in simplifying manufacturing process.

A yet another objective of the present invention is to provide a triode-type field emission device and a method of manufacturing the same. Wherein, the gate controls the potential differences of two sides of the cathode, thus controlling the number and directions of electrons guided through the cathode, in achieving localized adjustment of illumination, hereby raising resolution and quality of light emission.

A further objective of the present invention is to provide a triode-type field emission device and a method of manufacturing the same. Wherein, AC voltage is uses as a driving voltage, so that the cathode and gate having hedgehog-shape field emission layer formed thereon will perform electron emissions alternatively depending on the frequency, in raising its field emission efficiency and service life of the device.

In order to achieve the above-mentioned objective, the present invention provide a method of manufacturing triode-type field emission device, including the following steps: firstly, providing a cathode substrate; next, designing patterns of cathode and gates on a screen plate and designing the corresponding position marks, then forming at least a patterned cathode and at least a patterned gate on a cathode substrate by means of screen printing, and a gap is arranged between the gate and a cathode; then, mixing a one dimensional nano organic vehicle, adhesive, conductive powder, and dispersion agent uniformly into a field emission paste, and applying the field emission paste at least on cathode through screen printing, and performing high temperature sinter to remove polymer, and solvent, so as to form a hedgehog-shape field emission layer on the cathode; subsequently, providing an anode substrate, to form a transparent conductive layer thereon, then, screen printing a light emission layer on the transparent conductive layer to perform sinter; and finally, disposing the cathode substrate and anode substrate in parallel and spaced apart, and packaging them into a triode-type field emission device.

Moreover, the present invention provides a triode-type field emission device, comprising: a cathode substrate and an anode substrate disposed in parallel and spaced apart with their inner surfaces facing each other, on the cathode substrate is provided with at least a patterned cathode and a patterned gate, and a gap is arranged between the gate and cathode; a hedgehog-shape field emission layer formed at least on the cathode; a transparent conductive layer and a light emission layer provided in sequence on the anode substrate, with the light emission layer located correspondingly to the hedgehog-shape field emission layer; and a supporting piece, placed between the cathode substrate and the anode substrate to form a vacuum space, in keeping a distance between the cathode substrate and the anode substrate, for sealing the gate, cathode, hedgehog-shape field emission layer, transparent conductive layer, and light emission layer therein.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings. And, in the following, various embodiments are described in explaining the technical characteristics of the present invention.

The present invention provides a new triode-type field emission device and method of manufacturing same, such that the triode-type field emission device thus produced by screen printing process can be a curve surface cathode/gate structure with wider scope of application. The triode-type field emission device can be driven with DC voltage or AC voltage. In addition, the gate structure can be driven with AC voltage, so that the role of gate structure and cathode structure can be exchanged at fixed frequency, thus the gate structure may play the role of a gate and an emitter alternatively, to perform the role of electron emissions with the cathode alternatively, in achieving high field emission efficiency and longer service life.

Figure 1:
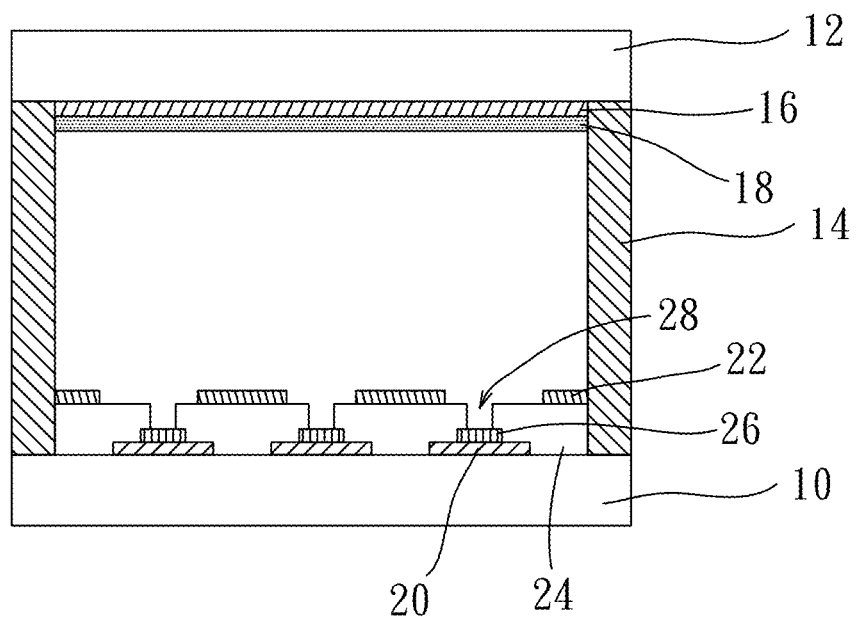
FIG. 1 is a schematic diagram of triode-type structure field emission device according to the prior art.
Figure 2:
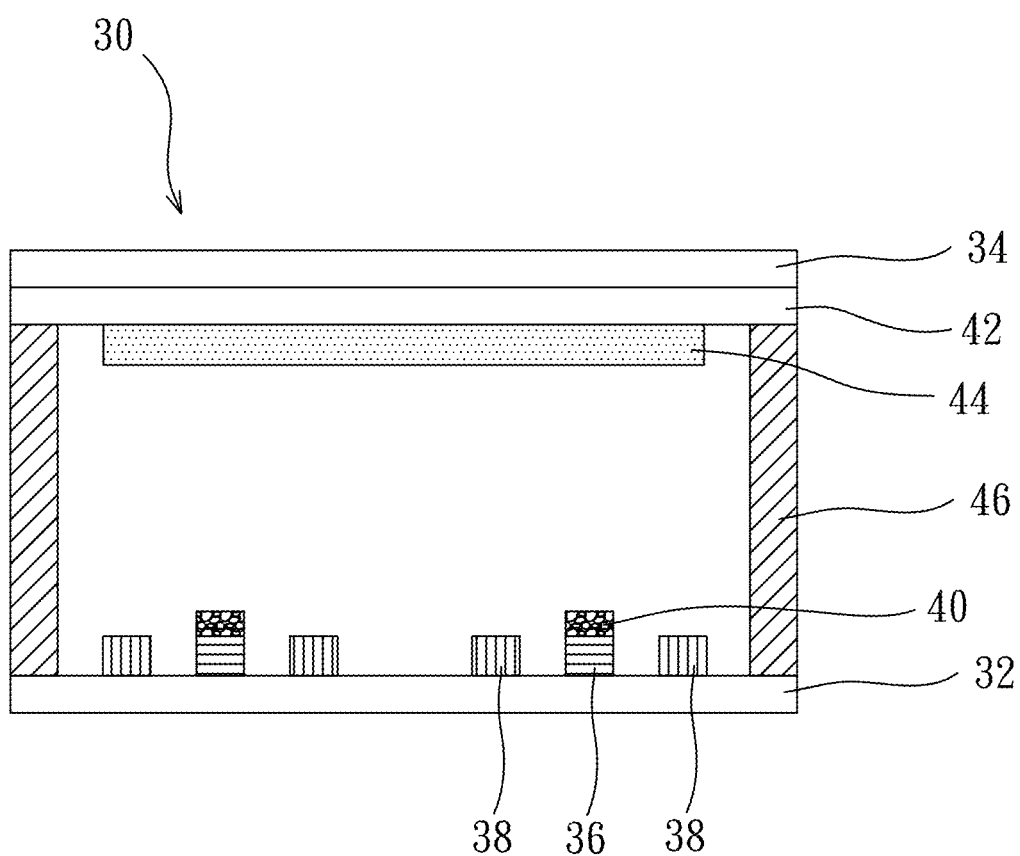
FIG. 2 is a schematic diagram of a triode-type field emission device according to the present invention.
Figure 3A:
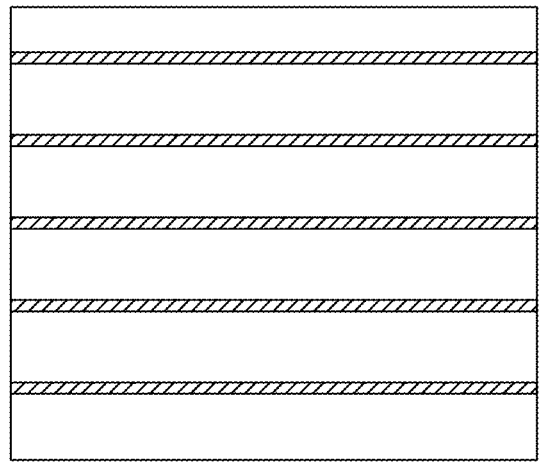
FIGS. 3a to 3d are schematic diagrams of geometric patterns of electrode structures made according to the present invention.
Figure 3B:
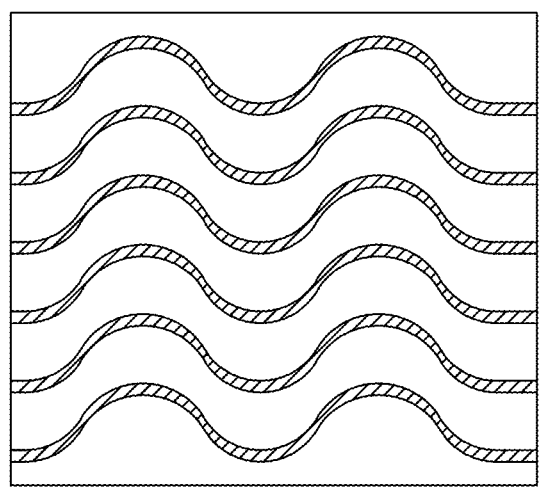
Figure 3C:
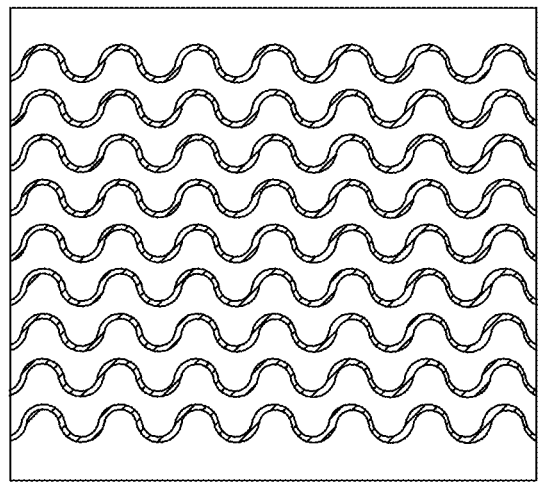
Figure 3D:
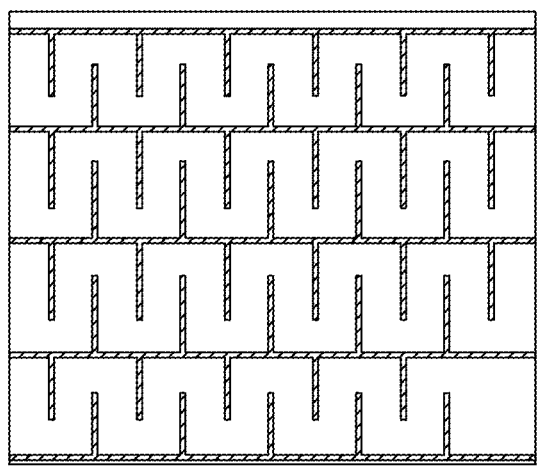

Refer to FIG. 2 for a schematic diagram of a triode-type field emission device according to the present invention. As shown in FIG. 2, the triode-type field emission device 30 comprises: a cathode substrate 32 and an anode substrate 34, disposed in parallel and spaced apart with theirs inner surfaces facing each other. The cathode substrate 32 and the anode substrate 34 can be made of glass or other transparent and insulation materials. On the inner surface of the cathode substrate 32 is provided with at least a patterned cathode 36 and at least a patterned gate 38, a gap is kept in between to prevent short circuit or interference for getting too close, such that the preferred distance of that gap is between 20 µm to 200 µm. In addition, the height of gate 38 and cathode 36 is preferably between 200 nm to 50 µm, with line width between 20 and 200 µm. A hedgehog-shape field emission layer 40 is formed on the cathode 36, or it can be formed on both the gate 38 the gate 36 at the same time, and that will be explained later.

On the inner surface of anode substrate 34 is provided a transparent conductive layer 42 and a light emission layer 44. The transparent conductive layer 42 can be made of ITO glass, while the light emission layer 44 is located correspondingly to the hedgehog-shape field emission layer 40, and can be made of phosphor powder capable of emitting red, green, blue, white, or a mixed light of them. And finally, a support piece 46 made of glass of thickness about 2 mm to 1 cm, is disposed vertically between cathode substrate 32 and anode substrate 34, to define a spacing in between, then tightly sealing the cathode 36, gate 38, the hedgehog-shape field emission layer 40, the transparent conductive layer 42 and the light emission layer 44, to keep them in a near vacuum state.

Wherein, the cathode 36 and gate 38 can be designed in an alternative arrangement to form into a set of electrodes, with a gap kept in between, and both are placed on a co-surface plane of the cathode substrate 32; or, alternatively, two gates 38 can be placed on both sides of a cathode 36 to form into a set of electrode structures of gate 38-cathode 36-gate 38. In the present invention, a plurality sets of electrode structures can be designed and placed on a co-surface plane of cathode substrate 32 depending on actual requirements. Herein, the electrode structure of gate 38-cathode 36-gate 38 is taken as an example for explanation, such that hedgehog-shape field emission layer 40 is formed only on a cathode 36.

In driving a triode-type field emission device 30, various voltages can be applied on to gate 38 and transparent conductive layer 42, such as 0~10 V/μm of gate electric field, and 0~20 V/μm of anode electric field, in cooperation with an AC driving voltage between gate 38 and cathode 36 having its duty cycle of 0~100%, and frequency 1~10 kHZ, such that the two gates 38 are able to control the potential difference between two sides of the cathode 36 depending on the variations of AC voltage, thus controlling the number and directions of electrons emitted by the hedgehog-shape field emission layer 40, so that electrons are accelerated by the electric field to impact onto the light emission layer 44 to agitate it into emitting visible light. By way of example, the AC driving voltage may control the bias between the cathode 36 and gate 38, and the potential difference thus produced is able to control the number and directions of the emitted electrons, in achieving local light adjustment, hereby raising resolution and quality of emitted lights.

In addition to the design that hedgehog-shape field emission layer 40 formed only on cathode 36, the hedgehog-shape field emission layer 40 may also formed on gate 38 and the cathode 36 at the same time, so that the AC driving voltage is able to drive the two field emission layers 40 to perform electron emissions alternatively, thus the gate 38 may play the role of gate and emitter, so the hedgehog-shape field emission layer 40 may emit electrons alternatively, in realizing a planar light source, hereby achieving better field emission efficiency and prolonged service life of the triode-type field emission device of the present invention.

Furthermore, the patterns of the cathode 36 and gate 38 can be designed into various geometric shapes, refer to FIGS. 3a to 3d, wherein it shows that it can be of a straight line shape, a big curve shape, a small curve shape, and a tree branch shape. In the drawings, each line represents the gates 38 on two sides, and the cathode 36 in between. In these designs, different curvatures (big curve shape, a small curve shape) and angles (tree branch shape) can be used in achieving maximum field emission efficiency.

Figure 4A:
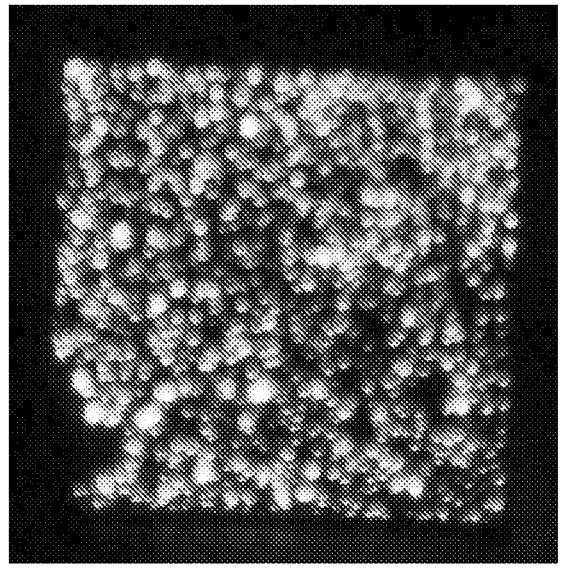
FIG. 4a is a diagram of a display device of point light source according to the prior art.
Figure 4B:
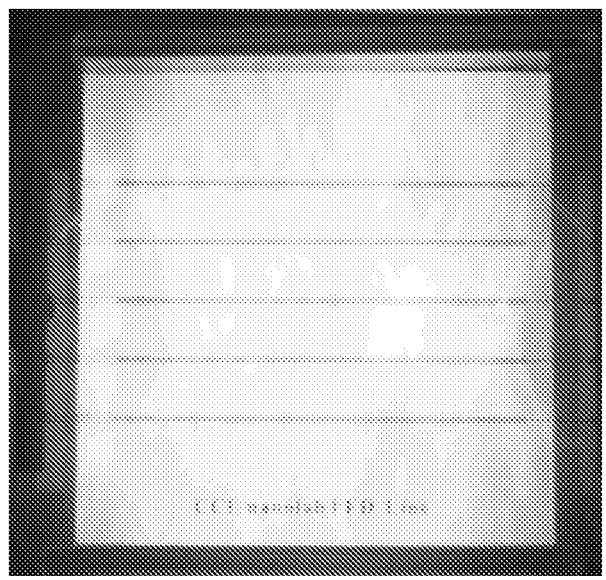
FIG. 4b is a diagram of a triode-type field emission device of a planar light source according to the present invention.

It is worth to note that, in the two-electrode structure of conventional field emission element, since the distance between anode and cathode is close, thus the electrons emitted by cathode impact directly onto anode, therefore, it presents a point light source, as shown in FIG. 4a. In comparison, in the present invention, the geometric pattern design of the cathode 36 and gate 38, its arrangement and driving approach, the way the hedgehog-shape field emission layer 40 is formed, all contribute to make it to have electron dispersion effect, thus it presents to be a planar light source, as shown in FIG. 4b. Therefore, it has great application potential for use in large area illumination device or displayer, and has a good competitive edge in the market.

Figure 5:
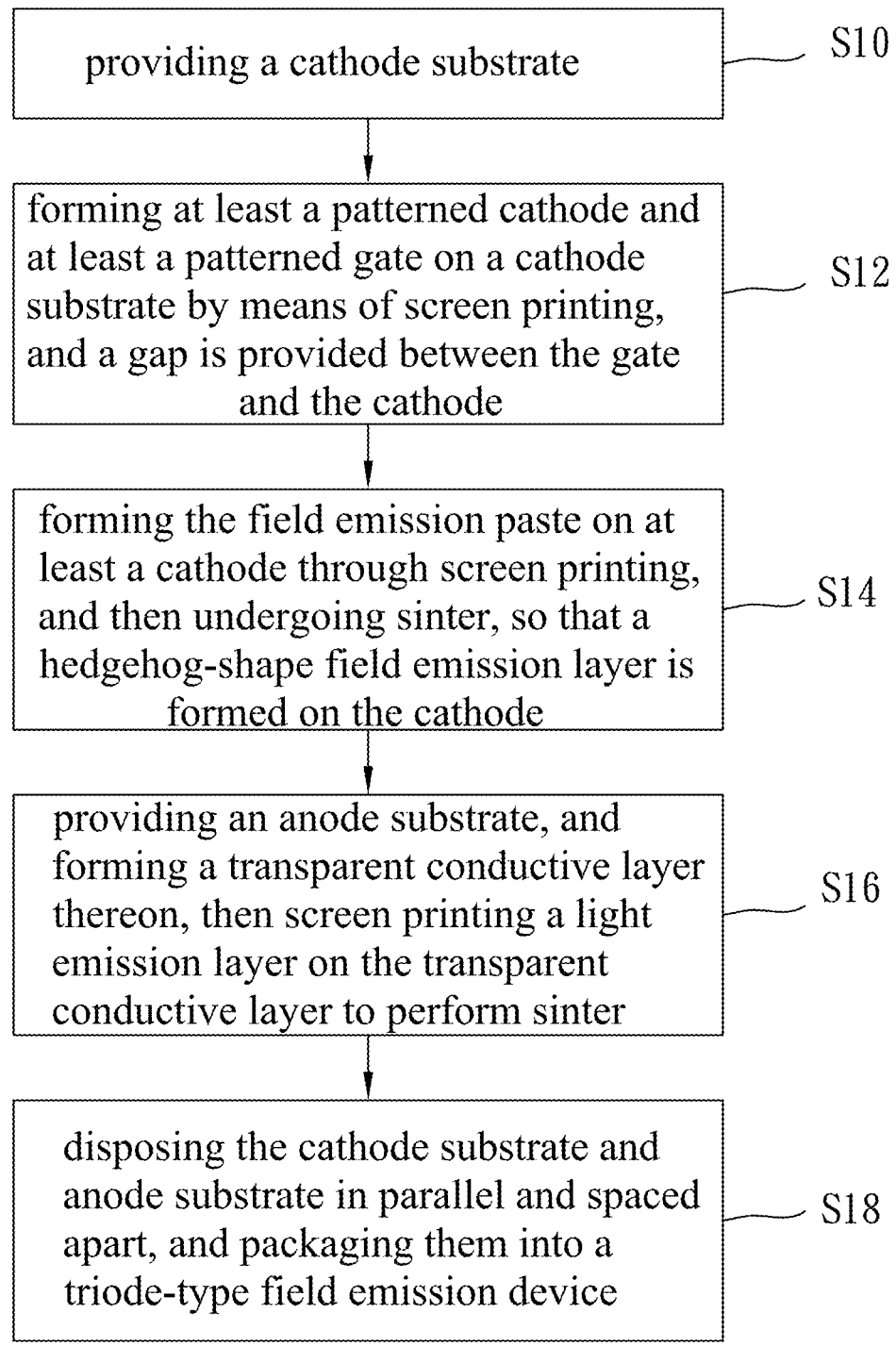
FIG. 5 is a flowchart of the steps of a method of manufacturing a triode-type field emission device according to the present invention.

After describing the structure of the triode-type field emission device of the present invention, we continue to describe the steps of manufacturing triode-type field emission device of the present invention. Refer to FIGS. 2 and 5 simultaneously, firstly, as shown in step S10, providing a cathode substrate 32: next as shown in step S12, providing on a screen plate patterns of cathode and gate, and corresponding position marks, then forming at least a patterned cathode 36 and at least a patterned gate 38 on a cathode substrate 32 by means of screen printing, and arranging a gap between cathode 36 and gate 38 to improve the problem of the prior art, that the emission surface of the emitter layer is far lower than the gate layer, in causing increase of threshold voltage of field emission, decrease of emission current density, and non-uniform light illumination.

Subsequently, as shown in step S14, providing field emitters, organic vehicle, adhesive, conductive powder, and dispersion agent. Wherein, the field emitters can be used as field emission materials of various types of structures, for example, single-wall carbon nanotube (SWNTs), multi-wall carbon nanotube (MWNTs), carbon nano fiber (CNFs) or carbon silicon linear material such as carbon silicide, metal oxide linear material such as, $Fe_2O_3$, $ZnO$, $MoO_3$, $SnO_2$, or $TiO_2$, and hedgehog-shape materials. The organic vehicle can be terpineol, ethyl cellulose (EC). The conductive powder can be conductive silver powder, carbon powder, nickel powder, or tin powder. The adhesive can be frits. The dispersion agent can be Triton X-100 interface activation agent. The materials mentioned above are grinded with a three-roller device and then are mixed sufficiently uniform to form a field emission paste. Then, the field emission paste is formed at least on a cathode 36 in a full cover shape, a dot shape, or a square shape by means of screen printing, and then it is subject to high temperature sinter, so that after thermal decomposition of the field emission paste, a hedgehog-shape field emission layer 40 is formed on the cathode. Of course, in addition to being formed on cathode 36, the field emission paste can be formed on cathode 36 and gate 38 simultaneously in full-cover shape, dot shape, or square shape.

Wherein, in step S14, the cathode substrate 32 can be put into an oven or an atmospheric furnace to undergo high temperature sinter depending on characteristics of field emission paste, so as to remove organic vehicle such as polymer, solvent etc. in completing the process of sinter. Wherein, the sinter temperature increase conditions are as follows: in the first stage, the temperature increase range is 300~350° C., the temperature increase rate is 2~10° C./min, then the temperature arrives at the temperature point, and stays there for 20~120 min, and the atmosphere is air; and in the second stage, the temperature increase range is 350~500° C., the temperature increase rate is 2~10° C./min, then the temperature arrives at the temperature point, and stays there for 20~120 min, so that in the thermal decomposition reactions, the field emission paste will grow into a hedgehog-shape field emission layer 40 of a hedgehog-shape field emission structure. The characteristics of the hedgehog-shape field emission structure is that, one face of which is always facing anode, hereby eliminating the subsequent step of surface activation, and simplifying the manufacturing process.

Figure 6A:
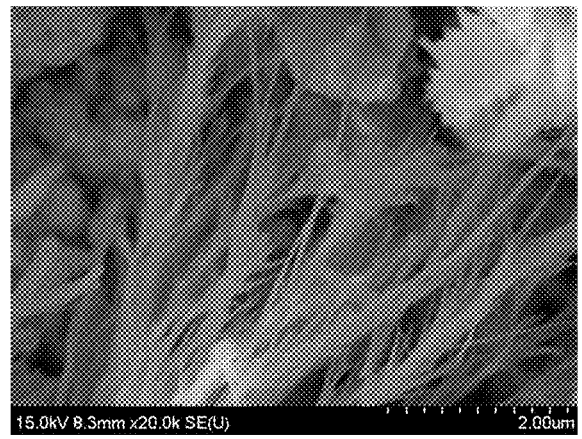
FIG. 6a is an image of hedgehog-shape nickel oxide nano line observed through a scanning electron microscope (SEM) according to the present invention.
Figure 6B:
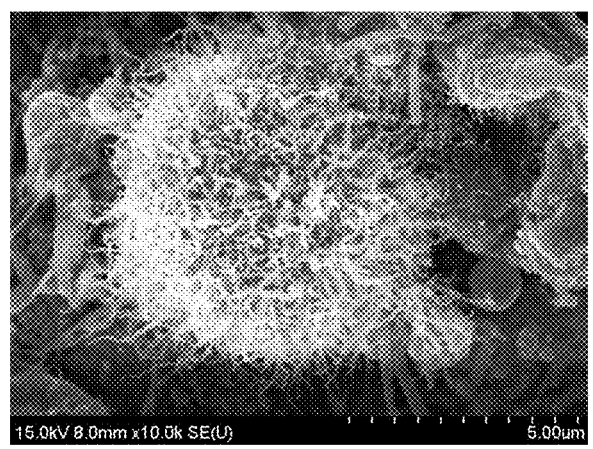
FIG. 6b is an image of hedgehog-shape tin oxide nano line observed through a scanning electron microscope (SEM) according to the present invention.

Refer to FIGS. 6a and 6b respectively at the same time for an image of hedgehog-shape nickel oxide nano line observed through a scanning electron microscope (SEM) according to the present invention; and an image of hedgehog-shape tin oxide nano line observed through a scanning electron microscope (SEM) according to the present invention. As shown in FIG. 6a, after going through sinter, the field emission paste can be formed into metal oxide nano line of hedgehog-shape, such as the nickel oxide nano line of hedgehog-shape; also, as shown in FIG. 6b, the field emission paste can be formed into tin oxide nano line of hedgehog-shape. Since the carbon nanotube is of hedgehog-shape, so it is able to emit electrons in all directions. Therefore, the hedgehog-shape field emitter structure produced by the present invention is a hedgehog-shape field emitter layer capable of all-direction electron emissions, such that it can achieve high current density, low turn-on voltage without undergoing the activation process.

Then, as shown in step S16, providing an anode substrate 34, on which is formed a transparent conductive layer 42, then screen printing a light emitter layer 44 on the transparent conductive layer 42, to perform the process of sinter. Finally, as shown in step S18, performing the packaging required, disposing the cathode substrate 32 and anode substrate 34 in parallel and spaced apart, and using a support piece 46 to seal around the cathode substrate 32 and the anode substrate 34, hereby sealing the cathode 36, the gate 38, hedgehog-shape field emission layer 40, the transparent conductive layer 42, and the light emitter layer 44, on the opposite inner surfaces of the cathode substrate 32 and the anode substrate 34, to make them in a vacuum state. As such, achieving a triode-type field emission device as shown in FIG. 2.

Figure 7:
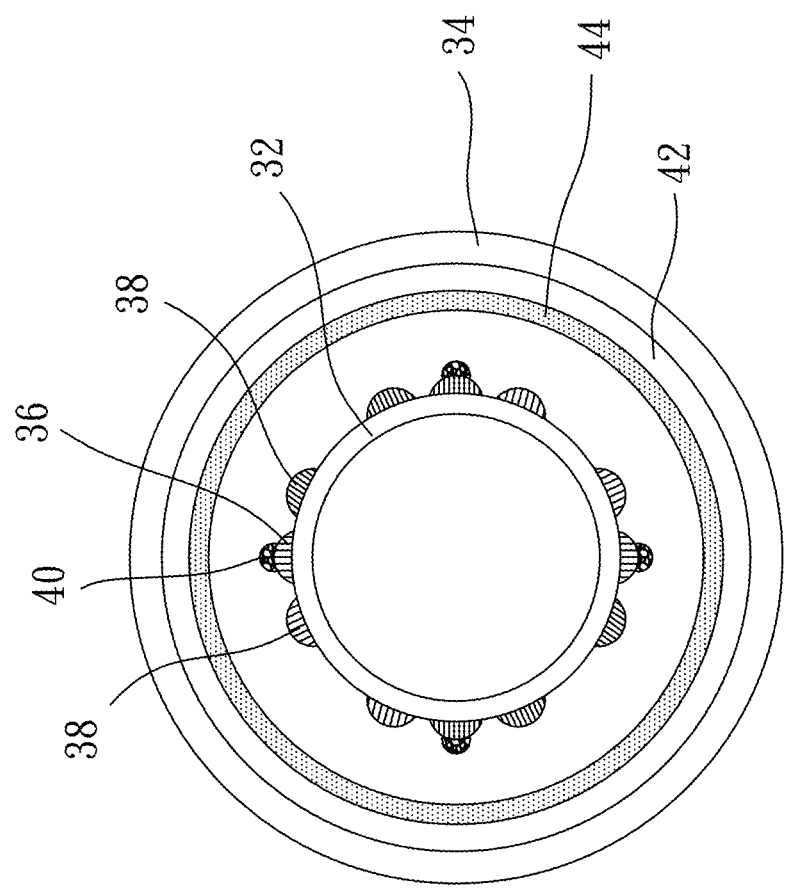
FIG. 7 is a schematic diagram of a triode-type field emission device of a tube-shape structure according to the present invention.

From the descriptions mentioned above, it can be known that, in the preset invention, the triode-type field emission device is made by a screen printing process, to simplify the manufacturing process, and raise its yield and applicability, so as to produce light emitting products such as backlight module and illumination light tube for large area displayer. It is worth to note that, in the present invention, cathode/gate structure of curved surface can be made, as shown in FIG. 7, which shows a triode-type field emission device of tube-shape structure, the structure and method of manufacturing are the same as the previous embodiment, and it will not be repeated here for brevity. Refer also to FIG. 2, the difference between the device in FIG. 7 and FIG. 2 is that, in the present embodiment of FIG. 7, the cathode substrate 32 having the cathode 36, gate 38, and hedgehog-shape field emission layer 40 produced thereon, is rolled with its inner surface facing outside into a hollow tube shape; then the anode substrate 34 having the transparent conductive layer 42 and the light emitter layer 44 produced thereon is rolled with its inner surface facing outside into a hollow tube shape; hereby making the inner surfaces of the cathode substrate 32 and the anode substrate 34 facing each other, then disposing a support piece (not shown) vertically between the cathode substrate 32 and the anode substrate 34, to serve as a support. As such, sealing tightly the cathode 36, gate 38, hedgehog-shape field emission layer 40, transparent conductive layer 42, and the light emitter layer 44 in a vacuum environment. From the descriptions mentioned above, it can be known that, in the present invention, screen printing process is utilized, so that it has wider applications, to overcome and improve the shortcomings of the prior art that numerous complicated lithographic processes are required to make cathode/gate structures, and that can not be applicable easily on curved substrates.

Summing up the above, the characteristics of the present invention can be summarized as follows:

(a) Making use of the screen printing process to reduce or eliminate significantly the equipment and related materials required for yellow light manufacturing process, thus reducing production cost effectively;

(b) Utilizing a unique field emission paste, to form hedgehog-shape field emission structure after undergoing high temperature sinter. The characteristic of this kind of structure is that, one of its surfaces is always facing toward anode, so as to eliminate the subsequent steps of surface activation, and simplify the manufacturing process;

(c) Providing electron dispersion capability through arranging the cathode and gate structure, to obtain an uniform planar light source, and increase field emission efficiency;

(d) Raising field emission efficiency;

(e) Utilizing side electric field of gate, to control the potential differences on left and right sides of cathode, to guide the emitted electrons, in achieving local light adjustment;

(f) Utilizing characteristics of AC voltage, to cause exchange of electron emissions by cathode and gate at fixed frequency, so that the two electrodes emit electrons alternatively depending on frequency, rather than emitting electrons continuously, so that the gate may play the role of an electrode and an emitter, hereby protecting the hedgehog-shape field emission layer, and prolonging its service life; and (g) Screen printing is utilized for planar substrate and curved substrate, so it has good advantages in the commercial application of illumination device, backlight module, and field emission displayer.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A triode-type field emission device manufacturing method, comprising following steps:
   providing a cathode substrate;
   forming at least a patterned cathode and two patterned gate on said cathode substrate by means of screen printing, and two said gates are located respectively on both sides of said cathode with said gap between each of two said gates and said cathode;
   applying a field emission paste on at least said cathode through said screen printing, and then undergoing high temperature sinter, so that a hedgehog-shape field emission layer is formed on said cathode, and an emission surface of said hedgehog-shape field emission layer is higher than top surface of said gates;
   providing an anode substrate, to form a transparent conductive layer thereon, then screen printing a light emission layer on said transparent conductive layer, and then performing sinter; and
   disposing said cathode substrate and said anode substrate in parallel and spaced apart, to package them into a triode-type field emission device.

2. The triode-type field emission device manufacturing method as claimed in claim 1, wherein said gap is between 20 and 200 μm.

3. The triode-type field emission device manufacturing method as claimed in claim 1, wherein height of said gate and said cathode is between 200 nm to 50 μm, and line width is between 20 to 200 μm.

4. The triode-type field emission device manufacturing method as claimed in claim 1, wherein said field emission paste is formed on said cathode in a full cover shape, a dot shape, or a square shape.

5. The triode-type field emission device manufacturing method as claimed in claim 1, wherein said field emission paste is formed on said gate and said cathode in a full cover shape, a dot shape, or a square shape.

6. The triode-type field emission device manufacturing method as claimed in claim 1, wherein said patterned cathode and patterned gate are of a straight line shape, a curve shape, or a tree branch shape.

7. The triode-type field emission device manufacturing method as claimed in claim 1, wherein said cathode substrate and said anode substrate are a plane or a curved substrate, and is made of transparent glass.

8. The triode-type field emission device manufacturing method as claimed in claim 1, wherein said field emission paste includes one dimensional nano organic vehicle, adhesive, conductive powder, and dispersion agent, and they are mixed uniformly by using a three-roller device.

9. The triode-type field emission device manufacturing method as claimed in claim 1, wherein said field emission paste undergoes thermal decomposition reaction during high temperature sinter, to form said hedgehog-shape field emission layer of nano line of Tin Oxide or Nickel Oxide.

10. The triode-type field emission device manufacturing method as claimed in claim 1, wherein said light emitting layer is made of phosphor powder that emits a red, green, blue, white or a mixed color light.

11. A triode-type field emission device, comprising:
- a cathode substrate, on which is provided with at least a patterned cathode and two patterned gate, and two said gates are located respectively on both sides of said cathode, with said gap between each of two said gates and said cathode;
- a hedgehog-shape field emission layer, formed at least on said cathode, and an emission surface of said hedgehog-shape field emission layer is higher than top surface of said gates;
- an anode substrate, disposed above said cathode substrate in parallel, on said anode substrate is provided with a transparent conductive layer and a light emission layer in sequence, said light emission layer is disposed corresponding to said hedgehog-shape field emission layer; and
- a support piece, disposed between said cathode substrate and said anode substrate in providing a space for seal tightly said gate, said cathode, said hedgehog-shape field emission layer, said transparent conductive layer, and said light emission layer.

12. The triode-type field emission device as claimed in claim 11, wherein said hedgehog-shape field emission layer is formed on said cathode in a full cover shape, a dot shape, or a square shape.

13. The triode-type field emission device as claimed in claim 11, wherein said hedgehog-shape field emission layer is formed on said gate and said cathode in a full cover shape, a dot shape, or a square shape.

14. The triode-type field emission device as claimed in claim 11, wherein said patterned cathode and patterned gate are of a straight line shape, a curve shape, or a tree branch shape.

15. The triode-type field emission device as claimed in claim 11, wherein said gate and said transparent conductive layer receives a different voltage respectively, that in cooperation with a AC driving voltage between said gate and said cathode, control potential differences between two sides of said cathode, that in turn control number and direction of electrons emitted from said hedgehog-shape field emission layer, so that electrons are accelerated by an electric field to impact onto said light emission layer, to adjust surface light intensity of said light emission layer.

16. The triode-type field emission device as claimed in claim 13, wherein said gate and said cathode are further connected to an AC power supply to provide AC voltage, so as to make said hedgehog-shape field emission layers on said gate and said cathode to emit electrons alternatively, to impact on said light emission layer to present a planar light source.

17. The triode-type field emission device as claimed in claim 16, wherein frequency of said AC voltage is 1 to 10 kHZ.

18. The triode-type field emission device as claimed in claim 11, wherein said cathode substrate and said anode substrate are a plane or curved substrates, and are made of transparent glass.

* * * * *